United States Patent Office 2,866,813
Patented Dec. 30, 1958

2,866,813

ALDEHYDE DIACYLATES AND PROCESS FOR PRODUCING THE SAME

Lucian W. McTeer, South Charleston, W. Va., assignor to Union Carbide Corporation, a corporation of New York No Drawing. Application March 29, 1956
Serial No. 574,615

5 Claims. (Cl. 260—488)

This invention relates to a process for producing aldehyde diacylates and to certain novel aldehyde diacylates produced thereby. More particularly, the present invention relates to a process for reacting an aldehyde and a carboxylic acid anhydride, either or both of which contains one or more carbon to carbon double bonds, in the presence of a boric acid-oxalic acid catalyst, to produce an aldehyde diacylate containing the same number of carbon to carbon double bonds as the total which was present in both reactants.

Although processes have been described for reacting simple mono-unsaturated aldehydes with anhydrides of lower saturated aliphatic acids, no process has been found which is entirely satisfactory for the production of such compounds. Furthermore, no process has been found for the production of aldehyde diacylates formed by reacting an anhydride of a saturated carboxylic acid with a more complicated unsaturated aldehyde, such as hexadienal, or for the production of an aldehyde diacylate formed by reacting an aldehyde with an anhydride of an unsaturated carboxylic acid.

The present invention overcomes the disadvantages of the prior art and makes possible the production of aldehyde diacylates more complex in structure than are presently known, as well as providing an improved method for producing the simpler aldehyde diacylates which are already known in the art.

The process of the present invention comprises reacting an aldehyde with a carboxylic acid anhydride at a temperature of from about —20° to about 100° C. in the presence of a boric acid-oxalic acid catalyst. Commercially, the reaction, which is exothermic, is preferably conducted at a temperature of 20° to 50° C.

Although the reaction is substantially complete as soon as the reactants and catalyst have been mixed, it is preferred to permit the reaction mixture to stand for an additional period of 1 to 3 hours after the mixing is completed, in order to obtain the highest yields.

While the preferred composition of the catalyst is an equimolar mixture of boric and oxalic acids, an excess of either compound may be used in compounding the catalyst without deleterious effect. However, the catalyst mixture should always contain no less than 0.01 mol percent of either acid and preferably no less than 10 mol percent of either acid. The two acids are believed to exert a synergist effect since neither acid alone will catalyze the reaction. This effect is demonstrated by the fact that the reactants may be mixed in the presence of a substantial amount of either of the catalytic acids and that no reaction will occur as long as only one of these acids is present. However, upon the addition to the mixture of even a minute amount, such as a single crystal, of the catalytic acid not present heretofore, the reaction proceeds immediately and vigorously.

In using the catalyst, a choice of procedures is available. A mixture of the solid boric and oxalic acids may be prepared and added directly to one of the reactants, preferably the organic acid anhydride. Similarly, the catalytic acids may be added separately in either order.

A preferred procedure to prepare the catalyst comprises dissolving boric acid and oxalic acid, in equimolar amounts in water to a total concentration of 30 percent at a temperature of 60° C. and then evaporating the solution to dryness under a pressure of about 30 mm. of mercury at a temperature of about 80° C. The resulting white solid is ground to powder form and used as catalyst.

The catalyst may be dissolved in the organic acid anhydride or a portion thereof, or in inert diluents, such as isopropyl ether, heptane, benzene, cyclohexane, and dioxane.

The catalyst may be present in a minimum concentration of 0.001 weight percent when composed of equimolar amounts of the two acids (based on the total reactant mixture). However, a preferred catalyst range for all mol ratios of the two acids is from about 0.02 to about 0.5 weight percent. Concentrations of 1.0 percent and higher are effective but tend to aid the formation of by-products.

In conducting the reaction, the mol ratio of acid anhydride to aldehyde may range from 0.1:1 to 10:1. However, the mol ratio is preferably within the range of from 1:1 to about 1.25:1 of acid anhydride to aldehyde. An excess of the aldehyde should be avoided. One reason for this is the possibility that a cyclic trimer of the aldehyde may be formed when an excess of the aldehyde is present.

The reactants may be combined in any one of several ways. For example, about ten percent of the total acid anhydride to be employed can be mixed with approximately twice an equal amount of an inert diluent, such as benzene, and all of the catalyst dissolved in the resulting mixture. About ten percent of the total aldehyde to be employed can then be added slowly with cooling to this catalyst solution. The remaining 90 percent of both reactants is combined separately in the absence of catalyst and this mixture fed to the first mixture containing the catalyst. The principal advantage of this method of mixing is that it ensures a constant mol ratio of reactants throughout the entire course of the reaction, a condition which does not prevail when the catalyst is dissolved in the entire amount of acid anhydride to be used and the aldehyde fed slowly thereto. Another procedure which may be used is illustrated in Example 2. While either procedure is usually productive of good efficiencies, the former is preferably in cases where either or both of the reactants has a tendency to polymerize or undergo dismutation or other undesired reactions. In most cases the reaction is quite vigorous and takes place as fast as the reactants can be mixed and the heat of reaction removed.

The reaction, in most cases, is so rapid under the conditions employed that it can be carried out on either a batch or on a continuous basis.

In the preferred embodiment of the invention the catalyst consists of an equimolar complex of boric and oxalic acids prepared by evaporating to dryness under reduced pressure an equimolar aqueous solution of the two acids. The catalyst is used in an amount equal to approximately 0.05 percent by weight of the total of 1.1 moles of the acid anhydride and 1.0 mole of the aldehyde to be used as reactants. The entire amount of catalyst is dissolved in 0.1 mole of the anhydride and one mole each of the aldehyde and anhydride are then fed to the solution of catalyst in 0.1 mole of anhydride. The two reactants may be advantageously mixed and fed as a single stream or, if desired, fed as two separate streams. In the latter procedure it is preferred that the rate of feed of the two reactants be controlled in order to maintain the mol ratio at approximately 1:1. The temperature of the reaction mixture is maintained between 20° C. and 50° C. by cooling, using any suitable means, and by controlling the overall rate of feed of reactants. After the feed of reactants has been completed, the reaction is allowed to continue until the heat of reaction ceases to be evolved. The catalyst is then neutralized with sodium acetate or other suitable agent, such as sodium bicarbonate, and the product is recovered by vacuum distillation or other suitable means.

Compounds which may be prepared in accordance with my invention may be represented by the generic formula:

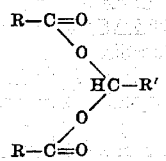

wherein R and R' are saturated or unsaturated aliphatic radicals. However, the process of the present invention is particularly applicable to the production of compounds wherein, in the above formula, R contains one or more carbon to carbon double bonds or where R' contains two or more carbon to carbon double bonds or where both R and R' contain carbon to carbon double bonds.

Illustrative of compounds which may be prepared by the present process are 1,1-diacetoxy-2-butene (the diacetic ester of 2-butene-1,1-diol), 1,1-diacetoxypropene (the diacetic ester of 2-propene-1,1-diol), 1,1-diacetoxy-2-methyl-2-propene (the diacetic ester of 2-methyl-2-propene-1,1-diol), and novel compounds such as 1,1-diacetoxy-2,4-hexadiene (the diacetic ester of 2,4-hexadiene-1,1-diol), 1,1-diacetoxy-2-ethyl-2-hexene (the diacetic ester of 2-ethyl-2-hexene-1,1-diol), 1,1-dicrotonoxy-2-butene (the dicrotonic ester of 2-butene-1,1-diol), and 1,1-dicrotonoxybutane (the dicrotonic ester of 1,1-butanediol). These compounds may be copolymerized by known procedures with monomers such as vinyl chloride to produce resins useful as protective coatings.

The present invention is also applicable to the reaction of both saturated and unsaturated aldehydes with mixed anhydrides of saturated and unsaturated acids such as acetic and crotonic, mixed anhydrides of saturated acids such as propionic and butyric, and mixed anhydrides of unsaturated acids such as crotonic and alpha-methacrylic. Other classes of aldehydes which might possibly be successfully employed as reactants include more highly unsaturated aldehydes such as octatrienal and unsaturated aldehydes containing an acetylenic linkage such as propargyl aldehyde.

The process of the present invention offers decided advantages over the previous art. Perhaps the greatest of these is that the specificity of the catalyst permits the carrying out of the reaction in comparatively short reaction times at temperatures which are readily obtained by use of water as coolant. By contrast, the prior art processes have utilized strong acid substances such as sulfuric acid as catalyst and the reaction has been conducted for extended times at temperatures low enough to require brine as coolant. On a commercial scale the shortening of reaction times and the substitution of water for brine as coolant would result in important savings. Other important advantages resulting from the use of the present invention are increased efficiency and, as previously pointed out, the fact that the present process may be used to prepare complex compounds not heretofore obtainable.

The following examples are illustrative:

*Example 1*

1,1-diacetoxy-2,4-hexadiene (the diacetic ester of 2,4-hexadiene-1,1-diol) was prepared by reacting acetic anhydride and 2,4-hexadienal in the presence of a boric acid-oxalic acid catalyst, which was prepared by dissolving 6.2 grams of boric acid and 12.6 grams of oxalic acid in 44 milliliters of water at a temperature of 60° C., and evaporating the mixture to dryness under a pressure of 30 mm. Hg, absolute, at a temperature of 80° C. In carrying out the reaction, 1.06 grams of the catalyst was dissolved in 93 grams of acetic anhydride and mixed with 200 milliliters of benzene. Then, 112 grams of 2,4-hexadienal were added to the mixture and the resulting mixture was then transferred to a reaction flask equipped with a stirrer and immersed in a water bath maintained at a temperature of 25°-30° C. A second mixture consisting of 1044 grams of acetic anhydride and 966 grams of hexadienal was then prepared in the absence of catalyst and fed into the first mixture. Total time of the addition was two hours. The final reaction mixture was then allowed to stand one additional hour at a temperature of 30° C., after which the catalyst was neutralized by the addition of 1.77 grams of anhydrous sodium acetate and the mixture distilled under reduced pressure. First a small amount of acetic acid was removed followed by the unreacted acetic anhydride and hexadienal. The refined 1,1-diacetoxy-2,4-hexadiene was then distilled off at a vapor temperature of 103°-105° C. at a pressure of about 3 mm. of mercury absolute. This material had a specific gravity of 1.044 at 20/20° C. and a refractive index of 1.4710 at 20° C. The purity of the refined material was 101.7 percent as determined by saponification and 101.5 percent based on low temperature bromination of the double bond in the 2 position. Of the total acetic anhydride fed 8.6 percent was recovered unchanged, so that the percent conversion was 91.4. Similarly, the percent conversion of hexadienal was 66.1. The 1,1-diacetoxy-2,4-hexadiene recovered was equivalent to 57.2 percent of the acetic anhydride reacted so that the efficiency of the reaction, based on acetic anhydride, was 57.2 percent. Similarly, the efficiency based on 2,4-hexadienal was 78.5 percent. The yield (product of the percent conversion and the efficiency) was 52.2 percent based on acetic anhydride and 51.9 percent based on 2,4-hexadienal.

*Example 2*

1,1-dicrotonoxybutane (the dicrotonic ester of 1,1-butanediol) was prepared by reacting butyraldehyde and crotonic anhydride in the presence of a catalyst consisting of boric and oxalic acids prepared as in Example 1. In 430 grams of crotonic anhydride there was dissolved 0.4 gram of the catalyst. Over a one hour period, 322 grams of butyraldehyde were fed to the mixture while maintaining the temperature between 25° and 50° C. by cooling. After addition of the butyraldehyde had been completed, the reaction mixture was allowed to stand another hour at 25° C., after which the catalyst was neutralized by the addition of 0.7 gram of sodium acetate and the mixture distilled. The refined 1,1-dicrotonoxybutane was recovered at a boiling point of 110° C. at 1 mm. Hg. It had a specific gravity of 1.003 at 25/20° C. and a refractive index of 1.4592 at 20° C. Purity of the material, based on saponification, was 98.1 percent. Based on butyraldehyde the yield and efficiency were 40.1 and 52.8 percent, respectively, while based on crotonic anhydride they were 64.2 and 67.0 percent.

*Example 3*

1,1-dicrotonoxy-2-butene (the dicrotonic ester of 2-butene-1,1-diol) was prepared by reacting crotonaldehyde and crotonic anhydride in the presence of a catalyst which was a mixture of boric and oxalic acids prepared as in Example 1. In 42.3 grams of crotonaldehyde there was dissolved 0.047 gram of catalyst. Over a period of 2 hours there was then added 52 grams of crotonic anhydride. The reaction was vigorously exothermic. Temperature was maintained between 30 and 40° C. by cooling in a water bath. After addition of the crotonic anhydride was completed, the mixture was allowed to stand for one additional hour at 30° C. after which it was heated to and maintained at a temperature of 50° C. for one hour and then cooled to 30° C. and allowed to stand for an additional hour. The catalyst was then neutralized by the addition of 0.1 gram of sodium acetate and the mixture distilled under reduced pressure. The refined product was recovered at a vapor temperature of 138° C. at 3 mm. Hg. It had a specific gravity of 1.036 at 20/20° C. and a refractive index of 1.4760 at 20° C. Based on analysis by saponification, the refined material had a purity of 95.9 percent and was contaminated with 3.3 percent crotonic anhydride. Based on bromination of all three double bonds the purity of the refined material was 105.0 percent. Based on crotonaldehyde the yield and efficiency were 56.7 and 92.2 percent, respectively, while based on crotonic anhydride they were 67.8 and 70.5 percent.

*Example 4*

1,1-diacetoxy-2-ethyl-2-hexene (the diacetic ester of 2-ethyl-2-hexane-1,1-diol) was prepared by reacting 2-ethyl-3-propylacrolein with acetic anhydride in the presence of a catalyst prepared as in Example 1. About 1.6 grams of catalyst was dissolved in 1535 grams of acetic anhydride. Over a period of two hours 1700 grams of 2-ethyl-3-propylacrolein was added. The reaction was only slightly exothermic. At the conclusion of the addition of the aldehyde the temperature was raised to 50° C. and maintained for four hours and then raised to 80° C. for four hours, following which the catalyst was neutralized by the addition of 2.8 grams of sodium acetate and the mixture distilled under reduced pressure. The refined 1,1-diacetoxy-2-ethyl-2-hexene was distilled off at a vapor temperature of 85–87° C. at a pressure of about 0.5 mm. Hg. The material had a specific gravity of 0.980 at 27/20° C. and a refractive index of 1.4407 at 20° C. Purity of the material was 99.0 percent based on saponification and 98.6 percent based on unsaturation. Based on 2-ethyl-3-propylacrolein, yield and efficiency were 35.2 and 67.7 percent, respectively, while based on acetic anhydride they were 30.3 and 60.8 percent. A by-product identified as 1-acetoxy-2-ethyl-1,3-hexadiene was also produced at a rate of one mole per each 3.4 moles of primary product. This by-product which was distilled off in substantially pure form at a vapor temperature of 57° C. at 1 millimeter pressure, resulted from the clevage of a mole of 1,1-diacetoxy-2-ethyl-2-hexene to produce one mole of acetic acid and one mole of 1-acetoxy-2-ethyl-1,3-hexadiene. The yield and efficiency to the by-product, based on the aldehyde, were 10.4 and 20 percent, respectively, while based on the anhydride they were 8.9 and 17.8 percent.

*Example 5*

1,1-diacetoxy-2-butene (the diacetic ester of 2-butene-1,1-diol) was prepared by reacting acetic anhydride and crotonaldehyde in the presence of a catalyst which was an equimolar mixture of boric and oxalic acids, prepared as in Example 1. In carrying out the reaction, 2.0 grams of the catalyst was dissolved in 260 grams of acetic anhydride. Crotonaldehyde, in the amount of 142 grams, was then slowly added to the catalyst solution while cooling and agitating the solution. The entire mixture was then placed in a reaction flask immersed in a cooling water bath and equipped with a stirrer. Over a period of 5 hours a second mixture consisting of 2330 grams of acetic anhydride and 1252 grams of crotonaldehyde was fed into the first mixture containing the catalyst. The reaction mixture was maintained at 25–30° C. by cooling. After addition of the second mixture had been completed the final reaction mixture was allowed to stand two additional hours at 25° C. after which the catalyst was neutralized by the addition of 2.6 grams of sodium acetate and the mixture distilled under reduced pressure. The refined 1,1-diacetoxy-2-butene was distilled off at a vapor temperature of 89° C. at a pressure of 10 millimeters Hg. It had a specific gravity of 1.057 at 20/20° C. and a refractive index of 1.4290 at 20° C. Purity of the material was 102.8 percent based on saponification and 99.0 percent based on unsaturation. Based on crotonaldehyde, the yield and efficiency were 94.2 and 96.0 percent, respectively, while based on acetic anhydride they were 73.8 and 94.8 percent.

*Example 6*

1,1-diacetoxypropene (the diacetic ester of 2-propene-1,1-diol) was prepared by reacting acrolein and acetic anhydride in the presence of a boric acid-oxalic acid catalyst prepared as in Example 1. In carrying out the reaction, 6 grams of the catalyst was dissolved in 3030 grams of acetic anhydride. Over a period of one hour, there were fed 832 grams of 93.7 percent acrolein. The reaction temperature was maintained at 40° C. After the mixing was complete the mixture was allowed to stand for two hours at a temperature of 35° C. after which the catalyst was neutralized by the addition of 7.3 grams of sodium acetate and the mixture was distilled. The refined 1,1-diacetoxypropene was distilled over and recovered at a boiling point of 73° C. at 8 mm. Hg pressure. Based on acrolein, the yield and efficiency to 1,1-diacetoxypropene were both 69.0 percent. Based on acetic anhydride, they were 32.3 and 56.7 percent, respectively. A by-product, identified as 1,3-diacetoxypropene, was produced at the rate of one mole per each 4.4 moles of 1,1-diacetoxypropene. The by-product was the result of isomerization of the primary product.

*Example 7*

Acetic anhydride and methacrolein were reacted in the presence of a catalyst consisting of boric and oxalic acids to produce 1,1-diacetoxy-2-methyl-2-propene (the diacetic ester of 2-methyl-2-propene-1,1-diol). In 2147 grams of acetic anhydride there was dissolved 1.7 grams of catalyst which was prepared as in Example 1. Over a period of 2 hours, 1260 grams of 93.3 percent methacrolein was fed into the reaction. Temperature of the reaction was maintained between 30° and 40° C. by cooling in a water bath. After all the aldehyde had been added the mixture was allowed to stand for one hour. The catalyst was then neutralized by the addition of 3.0 grams of sodium acetate after which the mixture was distilled. The refined 1,1-diacetoxy-2-methyl-2-propene was distilled off at a vapor temperature of 80–82° C. at 8 millimeters' pressure. It had a specific gravity of 1.039 at 27/20° C. and a refractive index of 1.4221 at 20° C. Based on methacrolein the yield and efficiency were 47.9 and 74.7 percent, respectively, while based on acetic anhydride they were 38.6 and 80.4 percent.

I claim:

1. A process for producing aldehyde diacylates which comprises bringing into reactive admixture an aliphatic aldehyde containing from 1 to 8 carbon atoms, inclusive, with a lower aliphatic carboxylic acid anhydride at a temperature of from about −20° C. to about 100° C. in the presence of a catalyst comprised of boric acid and oxalic acid.

2. A process for producing unsaturated aldehyde diacylates which comprises bringing into reactive admixture an aliphatic aldehyde containing from 1 to 8 carbon atoms, inclusive, with a lower aliphatic carboxylic acid anhydride, at least one of the two materials brought into admixture containing a carbon to carbon double bond, at a temperature of from about −20° C. to about 100° C. in the presence of a catalyst comprised of boric acid and oxalic acid, each of said acids being present as at least 0.01 mol percent by weight of the total catalyst.

3. A process for producing unsaturated aldehyde diacylates which comprises bringing into reactive admixture an aliphatic aldehyde containing 1 to 8 carbon atoms, inclusive, with a lower aliphatic carboxylic acid anhydride, at least one of the two materials brought into admixture containing a carbon to carbon double bond, at a temperature of from about −20° C. to about 100° C. in the presence of a catalyst comprised of boric acid and oxalic acid, wherein the product which is formed contains the same number of carbon to carbon double bonds as was present in the reactants.

4. A process for producing aldehyde diacylates which comprises bringing into reactive admixture from 0.1 to 10 molecular proportions of an aliphatic aldehyde containing from 1 to 8 carbon atoms, inclusive, with one molecular proportion of a lower aliphatic carboxylic acid anhydride at a temperature of from about −20° C. to about 100° C. in the presence of a catalyst comprised of boric acid and oxalic acid.

5. 1,1-diacetoxy-2,4-hexadiene.

References Cited in the file of this patent
UNITED STATES PATENTS

| | | |
|---|---|---|
| 2,312,193 | Richter | Feb. 23, 1943 |
| 2,316,472 | Tuerck | Apr. 13, 1943 |
| 2,393,740 | Brant et al. | Jan. 29, 1946 |
| 2,483,852 | Smith et al. | Oct. 4, 1949 |
| 2,483,853 | Smith et al. | Oct. 4, 1949 |
| 2,484,067 | Boese | Oct. 11, 1949 |
| 2,513,090 | Finch et al. | June 27, 1950 |
| 2,552,227 | Smith et al. | May 8, 1951 |
| 2,575,896 | Smith et al. | Nov. 20, 1951 |